United States Patent
Perera

(10) Patent No.: US 10,904,573 B2
(45) Date of Patent: Jan. 26, 2021

(54) REDUCED MULTIPLICATIVE COMPLEXITY DISCRETE COSINE TRANSFORM (DCT) CIRCUITRY

(71) Applicant: Embry-Riddle Aeronautical University, Inc., Daytona Beach, FL (US)

(72) Inventor: Sirani Kanchana Mututhanthrige Perera, Naples, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 120 days.

(21) Appl. No.: 16/206,093

(22) Filed: Nov. 30, 2018

(65) Prior Publication Data
US 2019/0166383 A1 May 30, 2019

Related U.S. Application Data

(60) Provisional application No. 62/593,116, filed on Nov. 30, 2017.

(51) Int. Cl.
*H04N 19/625* (2014.01)
*G06F 17/14* (2006.01)
*H04N 19/42* (2014.01)

(52) U.S. Cl.
CPC ......... *H04N 19/625* (2014.11); *G06F 17/147* (2013.01); *H04N 19/42* (2014.11)

(58) Field of Classification Search
CPC ..... H04N 19/625; H04N 19/42; G06F 17/147
USPC ...................................................... 382/250
See application file for complete search history.

(56) References Cited

U.S. PATENT DOCUMENTS

| | | | | |
|---|---|---|---|---|
| 5,911,130 A | * | 6/1999 | Shimizu | G10L 19/0212 704/229 |
| 6,587,590 B1 | * | 7/2003 | Pan | G06F 17/147 382/250 |
| 9,081,733 B2 | * | 7/2015 | Reznik | G06F 17/147 |
| 9,110,849 B2 | * | 8/2015 | Reznik | G06F 17/147 |
| 2010/0266008 A1 | * | 10/2010 | Reznik | G06F 17/147 375/240.2 |

(Continued)

FOREIGN PATENT DOCUMENTS

JP 03003568 A * 1/1991

OTHER PUBLICATIONS

Perera, "Complexity reduction, self/completely recursive, radix-2 DCT I/IV algorithms" Elsevier year 2020.*

(Continued)

*Primary Examiner* — Juan A Torres
(74) *Attorney, Agent, or Firm* — Schwegman Lundberg & Woessner, P.A.

(57) ABSTRACT

System and techniques for reduced multiplicative complexity discrete cosine transform (DCT) circuitry are described herein. An input data set can be received and, upon the input data set, a self-recursive DCT technique can be performed to produce a transformed data set. Here, the self-recursive DCT technique is based on a product of factors of a specified type of DCT technique. Recursive components of the technique are of the same DCT type as that of the DCT technique. The transformed data set can then be produced to a data consumer.

24 Claims, 7 Drawing Sheets

(56) References Cited

U.S. PATENT DOCUMENTS

2012/0177108 A1* 7/2012 Joshi ................... H04N 19/625
375/240.03

OTHER PUBLICATIONS

Shafait, "Architecture for 2-D IDCT for real time decoding of MPEG/JPEG compliant bitstreams," 2005 International Conference on Microelectronics, year 2005.*

Hou, "A fast recursive algorithm for computing the discrete cosine transform," IEEE Trans. Acoust. Speech Signal Process. 35 year 1987 pp. 1455-1461.*

Plonka, "Fast and numerically stable algorithms for discrete cosine transforms", Linear Algebra and its Applications 394, year 2005, 309-345.*

Chen, Wen-Hsiung, et al., "A Fast Computational Algorithm for the Discrete Cosine Transform", IEEE Transactions on Communications, vol. Com-25, No. 9, (Sep. 1977), 1004-1009.

Loeffler, Christoph, et al., "Practical Fast 1-D DCT Algorithms with 11 Multiplications", International Conference on Acoustics, Speech, and Signal Processing 1989 (ICASSP-89) 2,, (1989), 998-991.

Olshevsky, Alexander, et al., "A Comrade-Matrix-Based Derivation of the Different Versions of Fast Cosine and Sine Transforms", Proc. of SPIE, vol. 5205, Advanced Signal Processing Algorithms, Architectures, and Implementations XIII, (Dec. 2003), 399-410.

Plonka, Gerlind, et al., "Fast and numerically stable algorithms for discrete cosine transforms", Linear Algebra and its Applications 394, (2005), 309-345.

Puscel, Markus, et al., "Algebraic Signal Processing Theory: Cooley-Tukey Type Algorithms for DCTs and DSTs", IEEE Transactions on Signal Processing, vol. 56,No. 4, (Apr. 2008), 1502-1521.

Strang, Gilbert, "The Discrete Cosine Transform", SIAM Review 41, [Online]. Retrieved from the Internet: <URL:, (1999), 135-147.

Tablada, C. J., et al., "A Class of DCT Approximations Based on the Feig-Winograd Algorithm", Signal Processing, vol. 113, (2015), 38-51.

Wang, Zhongde, "On Computing the Discrete Fourier and Cosine Transforms", IEEE Transactions on Acoustics, Speech and Signal Processing, vol. ASSP-33, No. 4, (Oct. 1985), 1341-1344.

Perera, Sirani M., et al., "Lowest Complexity Self-Recursive Radix-2 DCT II/III Algorithms", SIAM J Matrix Anal. Appl., 39(2), (2018), 664-682.

* cited by examiner

REDUCED MULTIPLICATIVE COMPLEXITY DISCRETE COSINE TRANSFORM (DCT) CIRCUITRY

CLAIM OF PRIORITY

This patent application claims the benefit of priority, under 35 U.S.C. § 119, to United States Provisional Application Ser. No. 62/593,116, titled "SYSTEM AND METHOD FOR PERFORMING SELF-RECURSIVE DISCRETE COSINE TRANSFORM (DCT) AND INVERSE DISCRETE COSINE TRANSFORM (IDCT)" and filed on Nov. 30, 2017, the entirety of which is hereby incorporated by reference herein.

TECHNICAL FIELD

Embodiments described herein generally relate to digital signal processing and more specifically to reduced multiplicative complexity DCT circuitry.

BACKGROUND

Discrete Fourier Transforms (DFTs) are trigonometric transforms that convert a finite sequence of samples from a function into coefficients of sinusoids. The inverse can be used to convert these coefficients back into the original function. The Fast Fourier Transform (FFT) technique can be used to compute DFT and its inverse efficiently.

Variants of DFTs having real-valued transform matrices can be called Discrete Cosine Transforms (DCTs). DCTs generally involve extracting the real part of the complex DFT trigonometric form under particular boundary conditions. DCT transforms come in a variety of types based on the particular conditions such as DCT I, DCT II, DCT III, and DCT IV, among others.

DCTs are used in digital signal processing applications, such as in lossy compression of signals or recovery of signals (e.g., a decompression of a lossy compression or reconstruction after information is lost). In these applications. DCTs are widely used in modern computing for many significant image and audio compression formats, such as the Joint Photographic Experts Group (JPEG) image compression, Moving Picture Experts Group (MPEG) family of video compression, and MPEG-2 Audio Layer III (MP3), among many others.

For example, DCTs with orthogonal trigonometric transforms can be applied in digital video technology and high efficiency video coding. DCT II and its inverse. DCT III (e.g., IDCT), are popular in image compression techniques used in the JPEG and MPEG standards among others. DCT II is often considered the best generally-available transform technique as a suboptimal transform because its performance is close to that of the optimal Karhunen-Loeve Transform. High Efficiency Video Coding (HEVC) and H.264 video standards use the DCT II and DCT III. Compression for the H.264 standard is based on 4×4 and 8×8 DCT II and DCT III transforms. HEVC uses DCT transforms of size 4×4, 8×8, 16×16, or 32×32. Applications of DFT and DCT in image processing, signal processing, finger print enhancement, quick response code (QR code), and multi-mode interface are widespread.

The prevalence of DCT based compression and recovery of signals is so great that many devices include dedicated processing circuitry known as digital signal processors (DSPs) to facilitate the efficient processing of the DCT operations. DSPs come in a variety of configurations with a variety of capabilities but can generally be distinguished from other processor types by the inclusion of multiplier-accumulator (MAC) units. These hardware accelerators increase the efficiency of DSPs for signal processing over more general purpose central processing units (CPUs), finding wide adoption in commercial devices, such as mobile phones, tablet computes, laptop computers, digital radios, etc.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
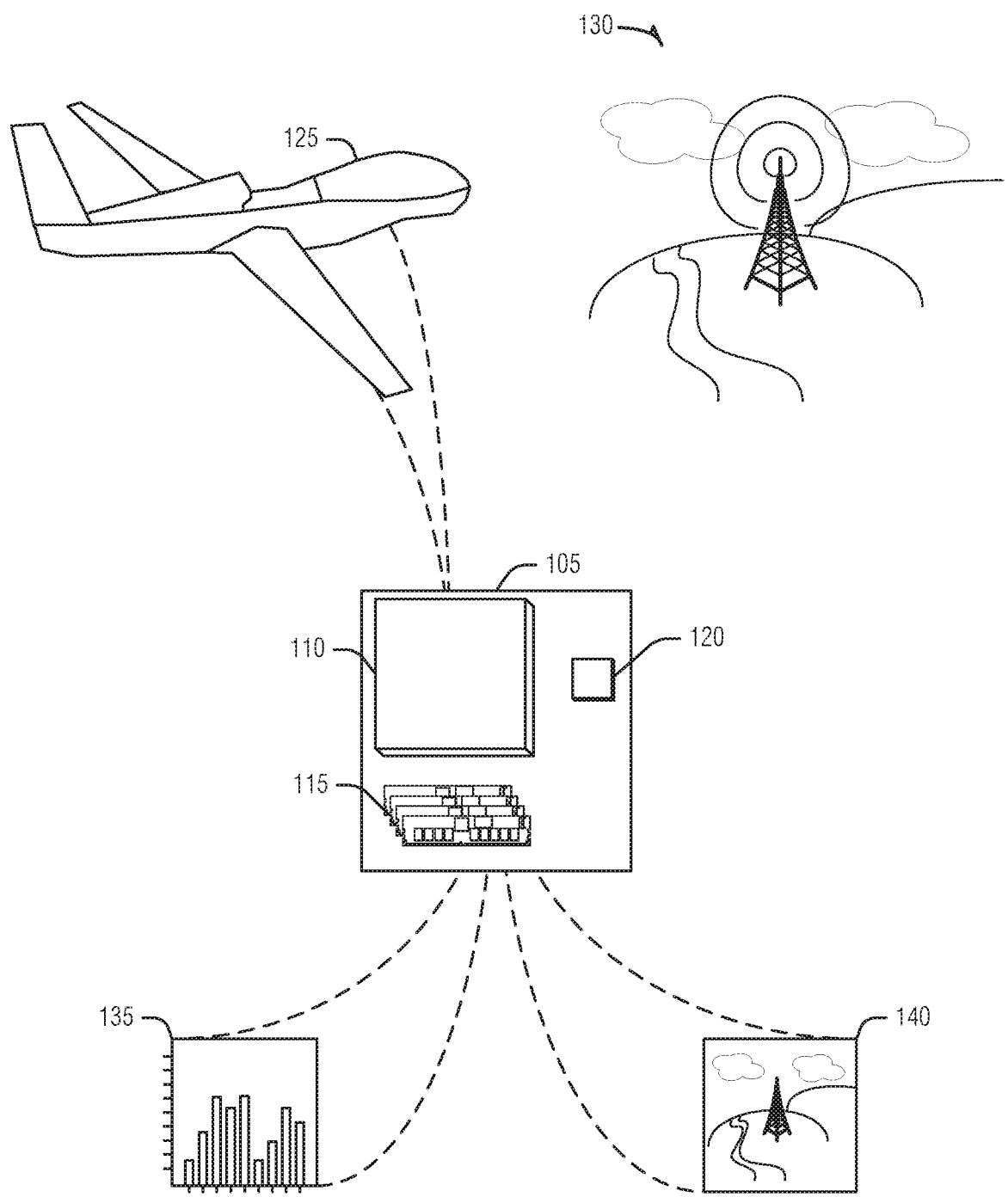
FIG. 1 illustrates an example of an environment including a system with reduced multiplicative complexity DCT circuitry, according to an embodiment.

The multiplicative complexity for computing DCTs can be quite high, with some with a computational complexity approaching $O(n^2)$ for an n×n DCT matrix. As noted above, the use of the DCTs in common tasks and this multiplicative complexity has led to specialized hardware to efficiently process these workloads. However, reducing the multiplicative complexity of DCT calculations can lead to increased throughput on current DSPs, or enable more power or space efficient DSPs by reducing the number of MACs, or other circuitry dedicated to performing the matrix multiplications inherent to DCT computation.

Techniques employed to reduce the multiplicative complexity of DCTs can include polynomial arithmetic—e.g., using a divide and conquer strategy to reduce the degree of the polynomial, polynomial division, and factorizing the DCT components to achieve a product (e.g., of real and sparse matrices) with fewer computations that yields the same result. Current factorization approaches have a number of drawbacks. For example, the factorizations may not be recursive, and thus can use much more storage to hold state variables, or be difficult to implement in hardware. In an example, the factorizations can rely on crossing DCT techniques. Thus, a DCT II factorization may use a DCT IV technique. This additional complexity not only makes algorithms more difficult, but can increase specialized hardware to support a single DCT type.

The following notation is used to illustrate various aspects of the present subject matter. For a given vector $x=[x_0, x_1, \ldots, x_{n-1}]^T \in \mathbb{R}^n$, the corresponding DCT is expressed as $y=Cx$, where C is the DCT matrix. DCT types (e.g., variants) DCT I, DCT II, DCT III, and DCT IV can be defined as follows:

$$C_{n+1}^I = \sqrt{\frac{2}{n}} \left[ \varepsilon_n(j)\varepsilon_n(k)\cos\left(\frac{jk\pi}{n}\right) \right]_{j,k=0}^{n}$$

$$C_n^{II} = \sqrt{\frac{2}{n}} \left[ \varepsilon_n(j)\cos\left(\frac{j(2k+1)\pi}{2n}\right) \right]_{j,k=0}^{n-1}$$

$$C_n^{III} = \sqrt{\frac{2}{n}} \left[ \varepsilon_n(k)\cos\left(\frac{(2j+1)k\pi}{2n}\right) \right]_{j,k=0}^{n-1}$$

$$C_n^{IV} = \sqrt{\frac{2}{n}} \left[ \cos\left(\frac{(2j+1)(2k+1)\pi}{4n}\right) \right]_{j,k=0}^{n-1}$$

where $$\varepsilon_n(0) = \varepsilon_n(n) = \frac{1}{\sqrt{2}}$$

and $\varepsilon_n(j)=1$ for $j \in \{1, 2, \ldots, n-1\}$ and $n \geq 2$ is an even integer. Superscript is used to denote the type of DCT matrices and the subscript to denote the order of DCT matrices.

An interesting factorization provides a self-contained derivation for recursive Chebyshev-like Vandermonde matrices. The following formulas illustrate this factorization of DCT II.

$$C_n^{II} = W_{Q_{C_n^{II}}} \begin{bmatrix} \text{odd}-\text{even} \\ \text{permutation} \end{bmatrix}^{-1} \begin{bmatrix} W_{even}^{-1} & \\ & I_{\frac{n}{2}} \end{bmatrix} \begin{bmatrix} C_{even}^{II} & \\ & G_{C_n^{II}} W_{even}^{-1} C_{even}^{II} \hat{G}_{C_n^{II}} \end{bmatrix} H_n$$

where $$C_{even}^{II} = C_{\frac{n}{2}}^{II}.$$

The weight matrix $W_Q$ is as follows:

$$W_{Q_{C_n^{II}}} = \sqrt{\frac{2}{n}} \text{diag}\left[ \frac{1}{\sqrt{2}}, \cos\left(\frac{\pi}{2n}\right), \ldots, \cos\left(\frac{(n-1)\pi}{2n}\right) \right]$$

The self-contained factorization for the Chebyshev-like polynomial Vandermonde matrix for DCT II can be stated as follows:

$$V_{Q_{C_n^{II}}} = \begin{bmatrix} \text{odd}-\text{even} \\ \text{permutation} \end{bmatrix} \begin{bmatrix} V_{even} & \\ & V_{odd} \end{bmatrix} H_n \text{ where}$$

$$H_n = \begin{bmatrix} I_{\frac{n}{2}} & \tilde{I}_{\frac{n}{2}} \\ I_{\frac{n}{2}} & -\tilde{I}_{\frac{n}{2}} \end{bmatrix}$$

and $\tilde{I}_{\frac{n}{2}}$ is the anti-diagonal identity matrix. Moreover, the Chebyshev-like polynomial Vandermonde matrix $$V_{even} = [Q_{2j}(d_{2k})]_{j,k=0}^{\frac{n}{2}-1}$$

is defined using $Q_0(d)=U_0(d)$ and $Q_k(d)=U_{k-1}(d)-U_{k-2}(d)$ for $k=1, 2, \ldots, n-1$ with respect to the classical Chebyshev polynomials $$U_k(d) = \frac{\sin((k+1)\arccos(d))}{\sin(\arccos(d))}.$$

The factorization for $V_{odd}$ has the form:

$$V_{odd} = G_{C_n^{II}} V_{even} \hat{G}_{C_n^{II}} \text{ where}$$

$$G_{C_n^{II}} = \begin{bmatrix} \frac{\cos\left(\frac{\arccos(d_0)}{2}\right)}{\cos\left(\frac{\arccos(d_1)}{2}\right)} & \frac{\cos\left(\frac{\arccos(d_2)}{2}\right)}{\cos\left(\frac{\arccos(d_1)}{2}\right)} & & \\ & \frac{\cos\left(\frac{\arccos(d_2)}{2}\right)}{\cos\left(\frac{\arccos(d_3)}{2}\right)} & \frac{\cos\left(\frac{\arccos(d_4)}{2}\right)}{\cos\left(\frac{\arccos(d_3)}{2}\right)} & \ddots \\ & & \ddots & \frac{\cos\left(\frac{\arccos(d_{n-2})}{2}\right)}{\cos\left(\frac{\arccos(d_{n-3})}{2}\right)} \\ & & & \frac{\cos\left(\frac{\arccos(d_{n-2})}{2}\right)}{\cos\left(\frac{\arccos(d_{n-1})}{2}\right)} \end{bmatrix} \text{ and}$$

$$\hat{G}_{c_n^{II}} = \frac{1}{2}\text{diag}\left[\frac{1}{\cos\left(\frac{\arccos(d_1)}{2}\right)}, \frac{1}{\cos\left(\frac{\arccos(d_3)}{2}\right)}, \ldots, \frac{1}{\cos\left(\frac{\arccos(d_{n-1})}{2}\right)}\right]$$

with respect to the nodes:

$$\{d_k\}_{k=0}^{n-1} = \left\{\cos\left(\frac{k\pi}{n}\right)\right\}_{k=0}^{n-1}$$

While the above factorization is self-contained (e.g., its recursive components do not use another DCT type), a simpler factorization (without the Vandermonde matrix $$V_{Q_{c_n^{II}}})$$

provides reduced complexity and a more flexible application to other DCT types (e.g., other than DCT type II) and greater values of fn. For example, consider the following factorization for DCT II:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n$$

where, for a given vector $x \in \mathbb{R}^n$, an even-odd permutation matrix $P_n (n \geq 3)$ can be defined as:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}$$

a bidiagonal matrix can be defined as:

$$B_{\frac{n}{2}} = \begin{bmatrix} \sqrt{2} & 1 & & & \\ & 1 & 1 & & \\ & & \ddots & \ddots & \\ & & & 1 & \\ & & & & 1 \end{bmatrix}$$

a diagonal matrix can be defined as:

$$[W_c]_{\frac{n}{2}} = \text{diag}\left[\frac{\sec\left(\frac{(2k-1)\pi}{2n}\right)}{2}\right]_{k=1}^{\frac{n}{2}}$$

and an orthogonal matrix can be defined as:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n$$

The radix-2 technique resulting from this factorization is self-recursive using sparse and orthogonal matrices. This factorization also gives the lowest theoretical bound of 2n−t−2 operations for n=8. Thus, using this factorization, a DCT II implementation will outperforms all other approaches to computing DCT II with fewer number of multiplications. Further, as described below, this factorization is directly related to DCT III and DCT IV computations, which can result in simplified hardware implementations as common computational components can be shared among these different DCT type calculations. Specifically, DCT III can be represented as follows:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n$$

and DCT IV can be represented in terms of the DCT II factorization as follows:

$$C_n^{IV} = B_n C_n^{II}[W_c]_n$$

with the sub-elements defined as above with respect to the DCT II factorization.

The self-recursive (e.g., self-contained or self-enclosed) DCT II or III factorizations described herein are less complex than that of the many established non-self-contained DCT II or III factorizations. As noted above, the arithmetic complexity, for an n×n DCT matrix, can approach $O(n^2)$ operations with traditional techniques. With use of the presently described self-recursive radix-2 DCT II or III techniques, it is possible to compute y in just ½nt−1 multiplication operations, which is a significant reduction of the complexity. This enables a simpler implementation in hardware or software. Thus, these techniques can be used to implement a self-recursive radix-2 technique for computing $y=C_n^{II}x$ and $y=C_n^{III}x$ for a given $x \in \mathbb{R}$. Additionally, multiplications can be further reduced by moving the scaling at $$\frac{1}{\sqrt{2}}$$

in the matrix $\overline{H}_n$ to the end of the calculation to compute $y=\sqrt{n}C_n^{II}x$ and $y=\sqrt{n}C_n^{III}$ more efficiently. Additional details and examples are provided below.

FIG. 1 illustrates an example of an environment 130 including a system 105 with reduced multiplicative complexity DCT circuitry, according to an embodiment. As illustrated, the system 105 is included in a device, such as a drone 125, a mobile phone, a tablet computer, etc. Here, the drone 125 includes sensors to sample the environment 130.

As illustrated, the drone 125 captures signals for visible light (e.g., via a camera) and radio-frequency (RF) signals from the tower. It is these signals that will be manipulated by the system 105 using DCT techniques to produce the frequency representation 135 of the RF and a compressed image 140 of the visible light.

As illustrated, the system 105 includes a CPU 110, memory 115, and a DSP 120. The examples given below discuss the implementation of DCT techniques using the DSP 120. However, in an example, these operations or features can be implemented in the CPU 110, or in other, not illustrated, processing circuitry. The memory 115 can be used to store interim values, processing state, or instructions that cause the processing circuitry of the system (such as the CPU 110 or the DSP 120) to perform operations or to use hardware to complete operations described below.

The DSP 120 is arranged to receive an input data set x. The input data set can be received from the memory 115, or from a hardware interface (e.g., a bus, interlink, etc.) coupled to a sensor of the drone 125. Here, x has n elements (e.g., a cardinality of n) and n is power of two greater than or equal to one. Also, x is in a real coordinate space of n dimensions.

The DSP 120 is arranged to perform a self-recursive DCT technique on the input data set to produce a transformed data set. As noted above, to be self-recursive, the recursive components of the DCT technique must use the same type of DCT calculation as the previous iteration. Thus, if the DCT type is DCT II, then each recursive component of the DCT II calculation must be a DCT II calculation. Further, the self-recursive DCT technique is a product of factors of a specified type of DCT technique.

In an example, the factors do not include a Vandermonde matrix. As explained above, the previous factorization of DCT II, for example, failed to simplify the Vandermonde matrix into easily computable sparse and orthogonal factors to simplify the DCT calculation. Further, with respect to the Vandermonde factorization noted above, the self-recursive DCT technique detailed herein can include a number of improvements, such as reducing the number of weight matrices; using a permutation and even-odd matrices as opposed to $$W_{Q_{C_n^{II}}};$$

using sparse and even-odd matrices to as opposed to $$G_{Q_{C_n^{II}}};$$

using an odd-weight matrix as opposed to $$\hat{G}_{Q_{C_n^{II}}};$$

or using the orthogonal matrix $\overline{H}_n$ as opposed to the scaled orthogonal matrix $H_n$, among other examples.

In an example, the factors of the self-recursive DCT technique are made up of an even-odd permutation of x, a bidiagonal matrix, a diagonal matrix, and an orthogonal matrix. In an example, the factors include only the even-odd permutation of x, the bidiagonal matrix, the diagonal matrix, and the orthogonal matrix, and no other components except for a single scaling factor. In an example, the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & 1 \end{bmatrix}.$$

In an example, the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}}.$$

In an example, the orthogonal matrix is of the form:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}}H_n.$$

In these examples, I is an identify matrix and $\tilde{I}$ is an anti-diagonal identity matrix.

In an example, the DCT type is DCT II. In an example, the even-odd permutation of x is of the form $$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}.$$

In an example, the product of factors is of the form $$C_n^{II} = P_n^T \begin{bmatrix} I_{\frac{n}{2}} & 0 \\ 0 & B_{\frac{n}{2}} \end{bmatrix}\begin{bmatrix} C_{\frac{n}{2}}^{II} & 0 \\ 0 & C_{\frac{n}{2}}^{II} \end{bmatrix}\begin{bmatrix} I_{\frac{n}{2}} & 0 \\ 0 & [W_c]_{\frac{n}{2}} \end{bmatrix}\overline{H}_n,$$

where, $P_n^T$ is the even-odd permutation $$B_{\frac{n}{2}}$$

is the bidiagonal matrix, $$[W_c]_{\frac{n}{2}}$$

is the diagonal matrix, and $\overline{H}_n$ is the orthogonal matrix as noted above.

In an example, the DCT type is DCT III. In an example, the even-odd permutation of x is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}.$$

In an example, the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n,$$

where, $P_n$ is the even-odd permutation, $$B_{\frac{n}{2}}$$

is the bidiagonal matrix, $$[W_c]_{\frac{n}{2}}$$

is the diagonal matrix, and $\overline{H}_n^T$ is the orthogonal matrix.

The DSP 120 can be arranged in a variety of ways to implement these DCT II and DCT III forms of the self-recursive DCT technique. For example, to compute the DCT II type of the self-recursive DCT technique, the DSP 120 can be arranged to serially (e.g., in the order noted below) processing the factors with the following operations:

$$u = \overline{H}_n x$$

then:

$$[v_j]_{j=0}^{n-1} = W_n^c u$$

then:

$$z1 = \cos 2([v_j]_{j=0}^{n_1-1}, n_1)$$

and $$z2 = \cos 2([v_j]_{j=N_1}^{n-1}, n_1)$$

then:

$$w = B_n^c (z1^T, z2^T)^T$$

and then:

$$y = P_n^T w$$

where cos 2( ) is the DCT II type self-recursive DCT technique and y is a result of the DCT II type self-recursive DCT technique. Note that the computations for z1 and z2 can be performed in parallel as each is independent from the other.

Similar to the DCT II arrangement of the DSP 120, the DSP 120 can be arranged to serially perform the following operations to compute the DCT III type self-recursive DCT technique:

$$u = P_n x$$

then:

$$[v_j]_{j=0}^{n-1} = [B^c]_n^T u$$

then:

$$z1 = \cos 3[v_j]_{j=0}^{n_1-1}, n_1)$$

then:

$$z2 = \cos 2([v_j]_{j=N_1}^{n-1}, n_1)$$

then:

$$w = [W^c]_n (z1^T, z2^T)^T$$

and then:

$$y = \overline{H}_n^T w$$

where cos 3( ) is the DCT III type self-recursive DCT technique and y is a result of the DCT III type self-recursive DCT technique. Again, the computations for z1 and z2 can be performed in parallel as each is independent from the other.

In an example, performing the self-recursive DCT technique includes configuring a reconfigurable logic device to realize the self-recursive DCT technique including using fewer multiplier cells than a non-self-recursive DCT technique. For example, the DSP 120, the CPU 110, or other processing circuitry can be arranged to configure a field-programmable gate array (FPGA) or other hardware to implement the DCT computations. Because the self-recursive DCT technique uses fewer operations (e.g., multiplications) than previous techniques, the result of this configuration would include, for example, fewer MAC units for a given throughput than is possible with other techniques. The reconfigurable logic device can be the DSP 120, or other processing circuitry used by the DSP 120, the CPU 110, etc.

The DSP 120 is arranged to produce the transformed data set via a hardware output interface to a consumer (e.g., the CPU 110, a remote device, etc.). As noted above, the DCT II type self-recursive DCT technique result can be used directly to compute a DCT IV result. Thus, in an example, the DSP 120 is arranged to transform the result of the product of factors for the DCT II technique $C_n^{II}$ via $C_n^{IV} = B_n C_n^{II} [W_c]_n$ to produce a DCT IV type result for the transformed data set. This post-processing to the DCT II result to produce the DCT IV result enables the DSP 120 to reduce features to produce this variety of DCT calculations.

The applications of the DSP 120 (or other processing circuitry) configured as described above are numerous. In an example, where the input data set comprises discrete values corresponding to samples of a time-varying signal, the transformed data set is a frequency-domain representation (e.g., frequency-domain 135) of the time-varying signal. Such an application is prevalent in modern audio compression, as well as RF communications.

In an example, where the input data set comprises discrete values corresponding to elements defining an image, the transformed data set is a representation of spatial frequencies corresponding to the discrete values. In an example, the discrete values correspond to a specified color channel of the image (common in image compression techniques, such as that employed by JPEG). In an example, values obtained from the transformed data set define a compressed representation of the input data set (e.g., image 140). In an example, a decompressed representation of the input data set is constructed from the compressed representation. In an example, constructing the decompressed representation includes applying weightings corresponding to values from the compressed representation to respective basis functions and summing the basis functions.

These last set of examples generally address encoding and compressing images using the DCT results from the self-recursive DCT technique. The following expands on this topic to provide additional context of image manipulation in this context.

Discretized images can be represented as matrices. To compress such images, different quantization techniques can be applied, such as at least one of color quantization, frequency quantization, or using quantization matrices. Although there are different techniques available to analyze two-dimensional (2D) image compression, the computational complexity of almost all such techniques is high (e.g., expensive from a computational standpoint) because the dense matrices used to analyze image compression results are often computationally complex to perform operations upon.

The low complexity self-recursive DCT technique, such as those detailed above (e.g., m cos 2(x, n) and m cos 3(x, n)) can be used to analyze image compression results. For example, starting with a 512 by 512 pixel red-green-blue (RGB) color image (e.g., size 512×512×3), 2D DCT II coefficients can be computed in a discretized 8×8 square of the 512×512 image to produce an output matrix that has values close to zero (e.g., up to three or four decimal places or accuracy). A blur effect can be used to verify how many coefficients in each transfer block (e.g., discretized 8×8 square) can be discarded (e.g., by applying a mask) without significantly affecting the quality of the reconstructed image (e.g., whether the reconstructed image can be identified by a person with the naked eye). Apart from the visual comparison of images, objective measures such as peak signal-to-noise ratio (PSNR) or the structural similarity index measurement (SSIM) can be used for further measurements of image qualities.

In an example, to perform the image compression using the DCT II or DCT III types of the self-recursive DCT technique, the RGB image is converted into a gray scale image. The converted image can then be divided into 8×8 blocks and 2D DCT II results (e.g., via m cos 2(x, n) of each block are computed. The DCT II coefficients can then be quantized by transforming, for example 87.5% of the DCT coefficients in each block to zero—e.g., discard all but eight of the 64 DCT coefficients in each block by applying an 8×8 mask matrix that is all zeroes but for eight ones). The result is the encoded image.

To decode the encoded image, coefficients can be computed with the DCT III type self-recursive DCT technique (e.g., m cos 3(x, n)) of each block. The blocks can then be assembled into a single image 140. Although some information is lost between the sensor reading of the environment 130 and the reconstructed image 140, the greater number of coefficients that are kept (e.g., the greater number of ones in the mask above), the more closely the image 140 will resemble the original sensor readings. The degree of this semblance can be quantified in several ways. For example, a peak signal-to-noise ratio, like structural similarity index measurement, mean square error (MSE), or universal quality index (UQI), can be used to measure the quality of compressed, reconstructed, restored, or corrupted images with respect to their reference image.

Based on self-recursive DCT techniques described herein—using sparse and scaled orthogonal factors—multiplicative complexity of DCT calculations is reduced. Further, the relationship between DCT II and DCT IV detailed above further enables component reduction in the DSP 120, for example, for the same performance of traditional DCT implementations. These efficiencies have led to, for example, the DCT II type self-recursive DCT technique to have the lowest multiplication complexity for all transform matrix sizes where $n \geq 32$ while attaining the lowest theoretical multiplication bound when $n=8$. Also, the DCT III type self-recursive DCT technique has the lowest multiplication complexity for all transform matrix sizes where $n \geq 4$ of known techniques.

Figure 2:
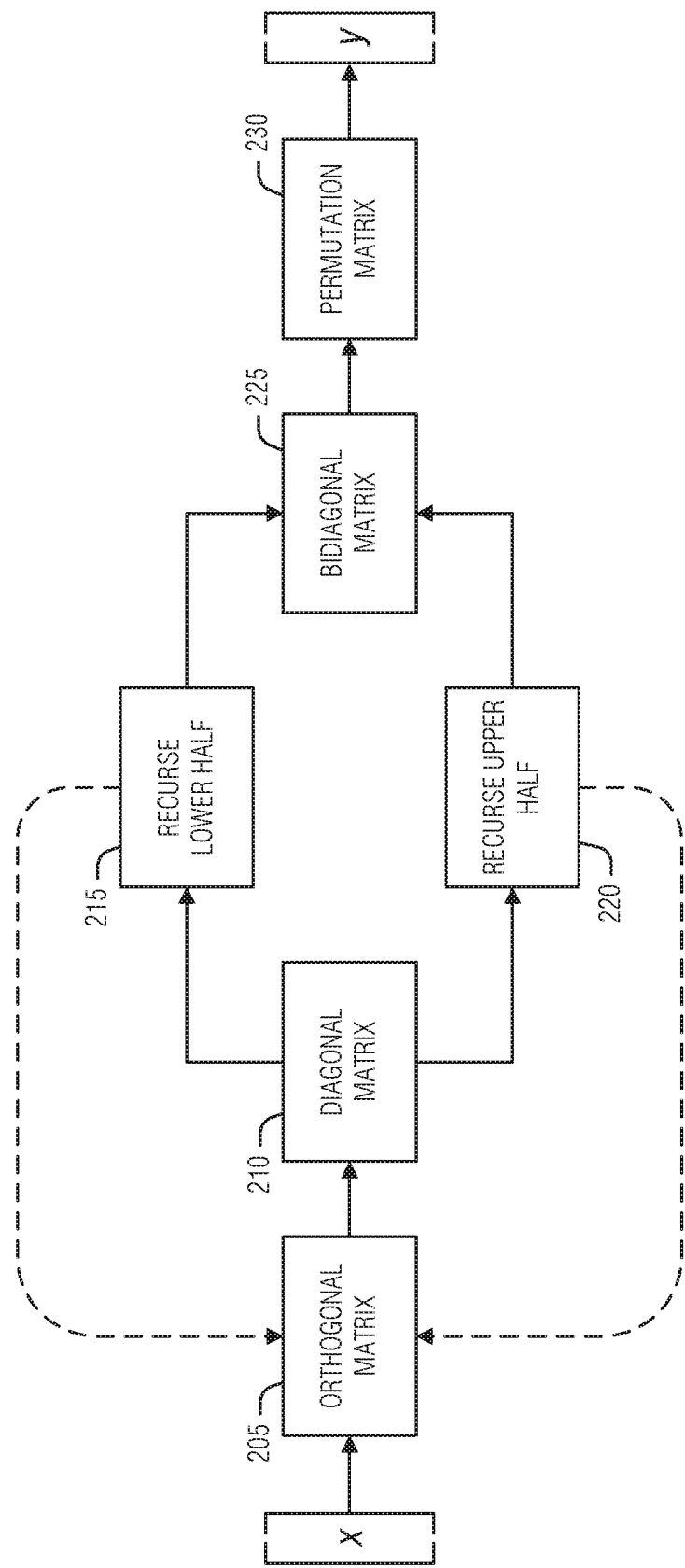
FIG. 2 illustrates a reduced multiplicative complexity pipeline to implement a DCT II technique, according to an embodiment.

FIG. 2 illustrates a reduced multiplicative complexity pipeline to implement a DCT II technique, according to an embodiment. This technique is referred to here as cos 2(x, n), where x is the input data set with n members. Here, $n=2^t (t \geq 1)$ and $x \in \mathbb{R}^n$. Also, cos 2(x, n) computes $y = C_n^{II} x$.

First, if n=2, then $$y = \frac{1}{\sqrt{2}} \begin{bmatrix} 1 & 1 \\ 1 & -1 \end{bmatrix} x.$$

Otherwise (e.g., $n \geq 4$), x is combined with the orthogonal matrix in block 205. This can be represented as:

$$u = \overline{H}_n x$$

where u is the output of block 205. This result is combined with a diagonal matrix in block 210 across all n in the present recursion. This can be represented as:

$$[v_j]_{j=0}^{n-1} = W_n^c u$$

Here, the vector $[v_j]_{j=0}^{n-1}$ holds the output of the block 210. The results of the block 210 are split into a top-half (e.g., block 215) and bottom-half (e.g., block 220) and processed recursively (e.g., starting at block 205) until the stop condition, n=2, is reached and the results returned up the recursion. The operation in block 215 can be represented as:

$$z1 = \cos 2([v_j]_{j=0}^{n_1-1}, n_1)$$

and the operation in block 220 can be represented as:

$$z2 = \cos 2([v_j]_{j=N_1}^{n-1}, n_1)$$

where z1 and z2 are the respective outputs of blocks 215 and 220, cos 2(x, n) is the call into block 205, and $$n_1 = \frac{n}{2}$$

(e.g., one-half of the current iteration's n).

Once the iterative blocks 215 and 220 complete for a given level of the recursion, their output is combined in block 225 via the bidiagonal matrix. This can be represented as:

$$w = B_n^c (z1^T, z2^T)^T$$

with the output being represented as w. Finally, block 230 combines the output of block 225 to produce y via the permutation matrix. This can be represented as:

$$y = P_n^T w$$

It is this y that will be returned up to blocks 215 or 220 in all but the last (e.g., top) level of recursion. Otherwise, y is the output of the DCT II type self-recursive DCT technique.

The blocks 215 and 220 can be modified by rescaling factorizations of the DCT II matrices. This form can be referred to as m cos 2(x, n) and can be used to compute $y = \sqrt{n} C_n^{II} x$. Here, the result when n=2 is changed to be $$y = \begin{bmatrix} 1 & 1 \\ 1 & -1 \end{bmatrix} x$$

and the orthogonal matrix applied at block 205 is changed to $H_n$, resulting in the operation of block 205 to be $U=H_n x$.

Figure 3:
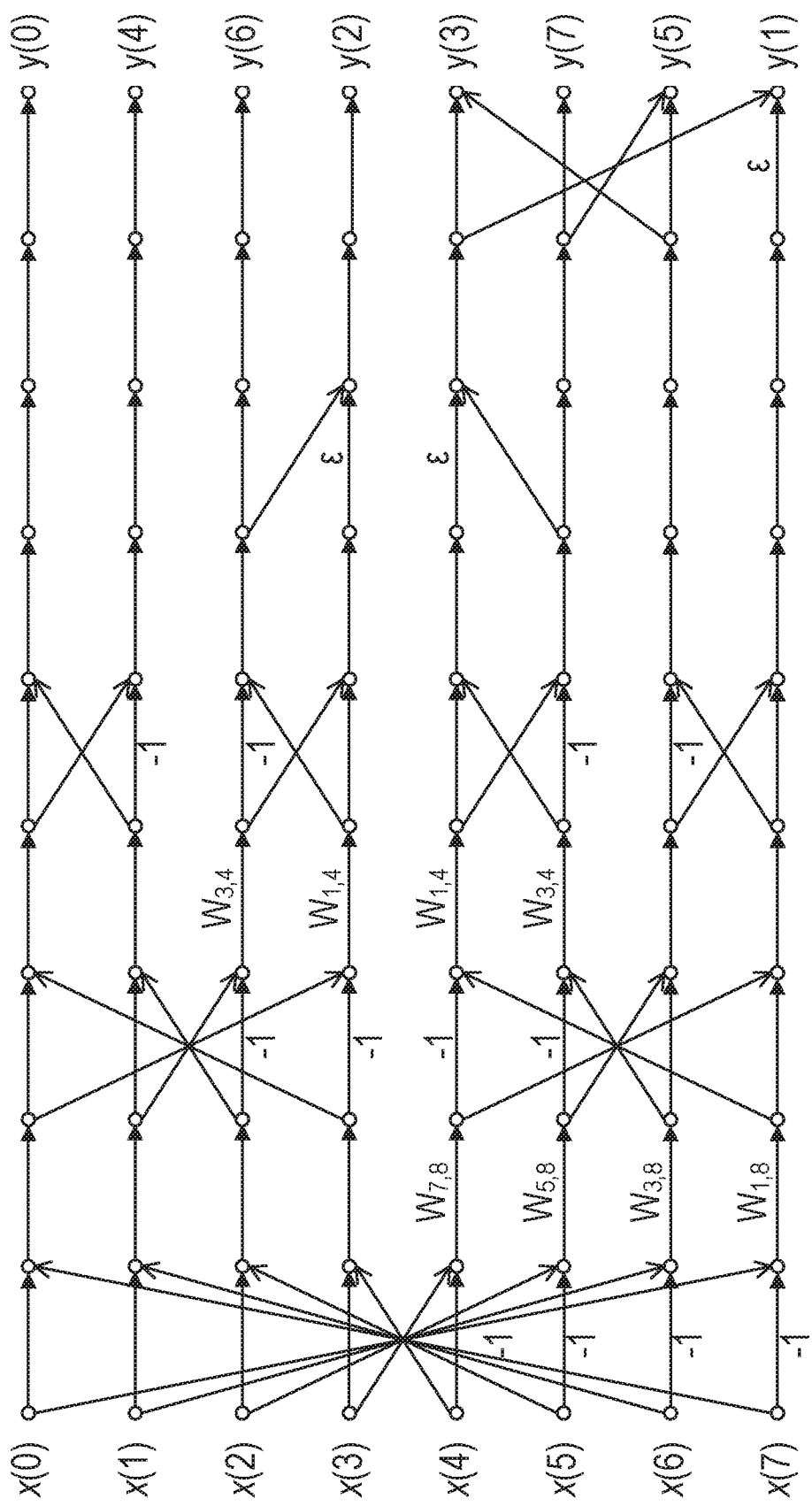
FIG. 3 illustrates an example of a decimation-in-frequency flow graph of a reduced multiplicative complexity pipeline implementing a DCT II technique on a signal, according to an embodiment.

FIG. 3 illustrates an example of a decimation-in-frequency flow graph of a reduced multiplicative complexity pipeline implementing a DCT II technique on a signal, according to an embodiment. Specifically, this diagram follows the pipeline of FIG. 2 and illustrates the simplicity of the pipeline. In FIG. 3, $\varepsilon=\sqrt{2}$ and $$W_{j,k} = \frac{1}{2}\sec\left(\frac{j\pi}{2k}\right).$$

Figure 4:
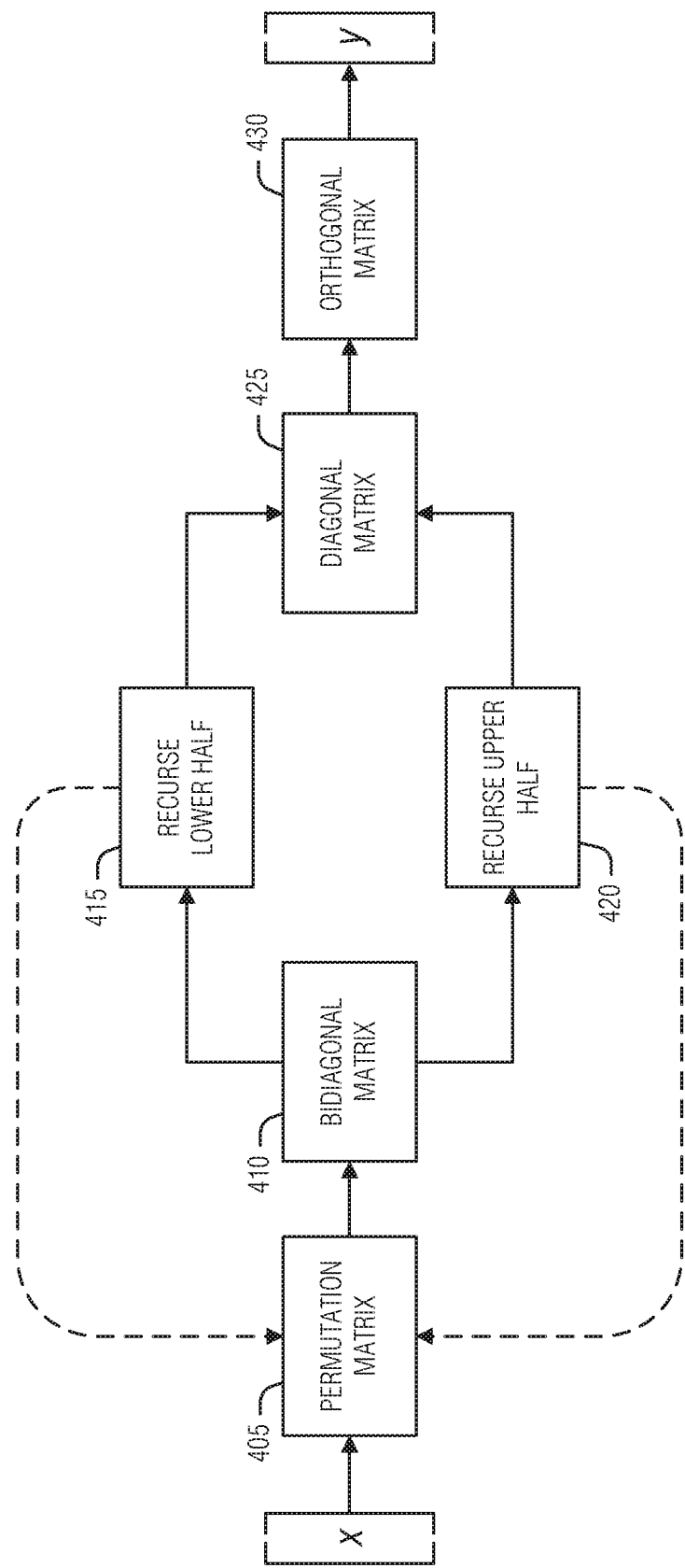
FIG. 4 illustrates a reduced multiplicative complexity pipeline to implement a DCT III technique, according to an embodiment.

FIG. 4 illustrates a reduced multiplicative complexity pipeline to implement a DCT III technique, according to an embodiment. Similar to the DCT II technique described above with respect to FIG. 2, this technique is referred to as cos 3(x, n), where x is the input data set with n members. Again, $n=2^t (t \geq 1)$ and $x \in \mathbb{R}^n$. Also, cos 3(x, n) computes $y=C_n^{III} x$.

First, if n=2, then $$y = \frac{1}{\sqrt{2}}\begin{bmatrix} 1 & 1 \\ 1 & -1 \end{bmatrix} x.$$

Otherwise (e.g., n≥4), x is combined with the permutation matrix in block 405. This can be represented as:

$$U=P_n x$$

where u is the output of block 405. This result is combined with the bidiagonal matrix in block 410 across all n in the present recursion. This can be represented as:

$$[v_j]_{j=0}^{n-1}=[B^c]_n^T u$$

Here, the vector $[v_j]_{j=0}^{n-1}$ holds the output of the block 410. The results of the block 410 are split into a top-half (e.g., block 415) and bottom-half (e.g., block 420) and processed recursively (e.g., starting at block 405) until the stop condition, n=2, is reached and the results returned up the recursion. The operation in block 415 can be represented as:

$$z1=\cos 3([v_j]_{j=0}^{n_1-1}, n_1)$$

and the operation in block 420 can be represented as:

$$z2=\cos 2([v_j]_{j=N_1}^{n-1}, n_1)$$

where z1 and z2 are the respective outputs of blocks 415 and 420, cos 3(x, n) is the call into block 405, and $$n_1 = \frac{n}{2}$$

(e.g., one-half of the current iteration's n).

Once the iterative blocks 415 and 420 complete for a given level of the recursion, their output is combined in block 425 via the diagonal matrix. This can be represented as:

$$w=[W^c]_n (z1^T, z2^T)^T$$

with the output being represented as w. Finally, block 430 combines the output of block 425 to produce y via the orthogonal matrix. This can be represented as:

$$y=\overline{H}_n^T w$$

It is this y that will be returned up to blocks 415 or 420 in all but the last (e.g., top) level of recursion. Otherwise, y is the output of the DCT III type self-recursive DCT technique.

The blocks 415 and 420 can be modified by rescaling the factorizations of the DCT II matrices. This form can be referred to as m cos 2(x, n) and can be used to compute $y=\sqrt{n}C_n^{III} x$. Here again, when n=2 y is changed to be $$y = \begin{bmatrix} 1 & 1 \\ 1 & -1 \end{bmatrix} x.$$

Also the orthogonal matrix of block 430 is changed to $H_n^T$, resulting in the operation of block 430 to be $y=H_n^T w$.

Figure 5:
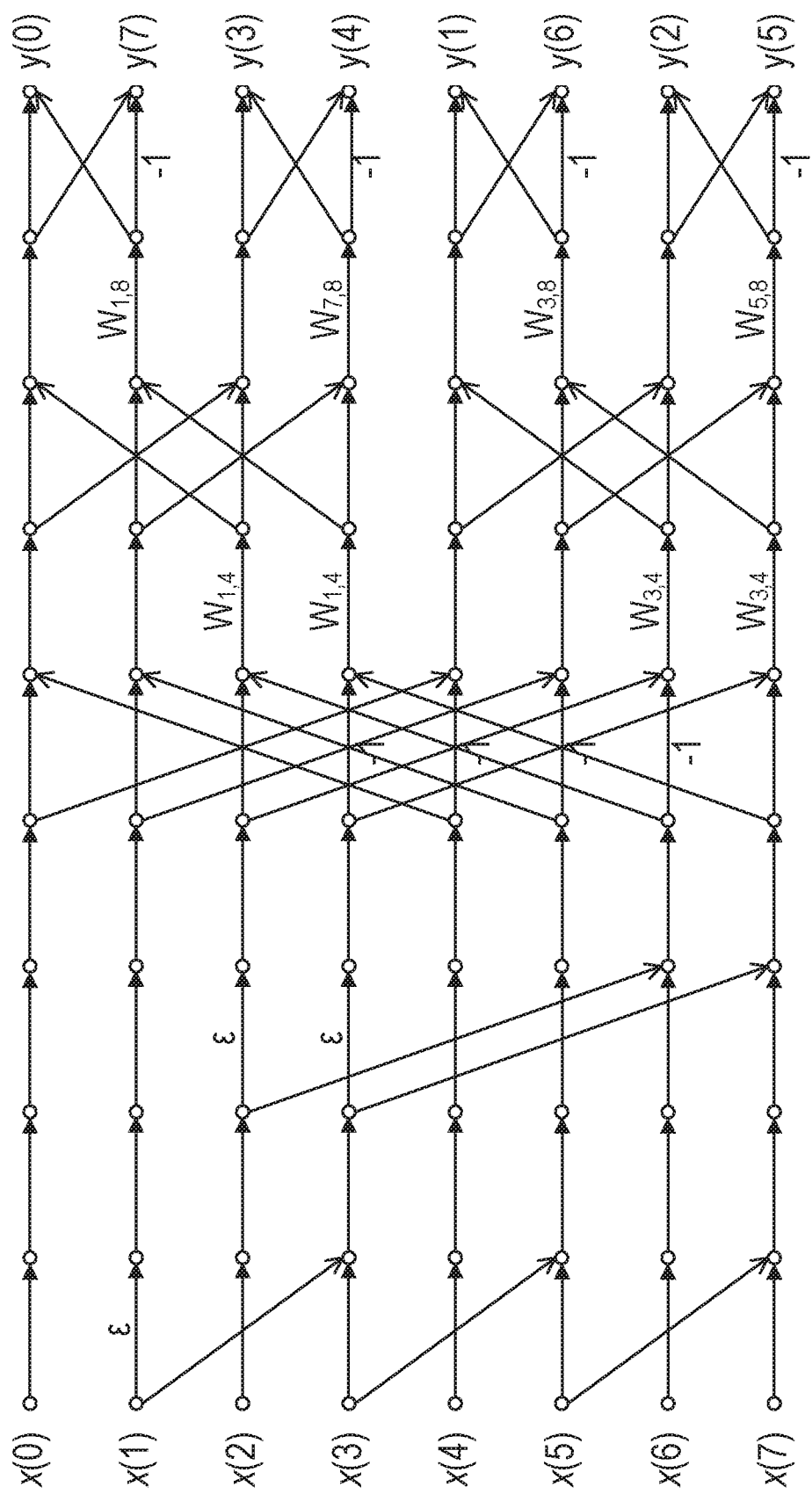
FIG. 5 illustrates an example of a decimation-in-frequency flow graph of a reduced multiplicative complexity pipeline implementing a DCT III technique on a signal, according to an embodiment.

FIG. 5 illustrates an example of a decimation-in-frequency flow graph of a reduced multiplicative complexity pipeline implementing a DCT III technique on a signal, according to an embodiment. Specifically, this diagram follows the pipeline of FIG. 4 and illustrates the simplicity of the pipeline. In FIG. 5, as in FIG. 3, $\varepsilon=\sqrt{2}$ and $$W_{j,k} = \frac{1}{2}\sec\left(\frac{j\pi}{2k}\right).$$

Figure 6:
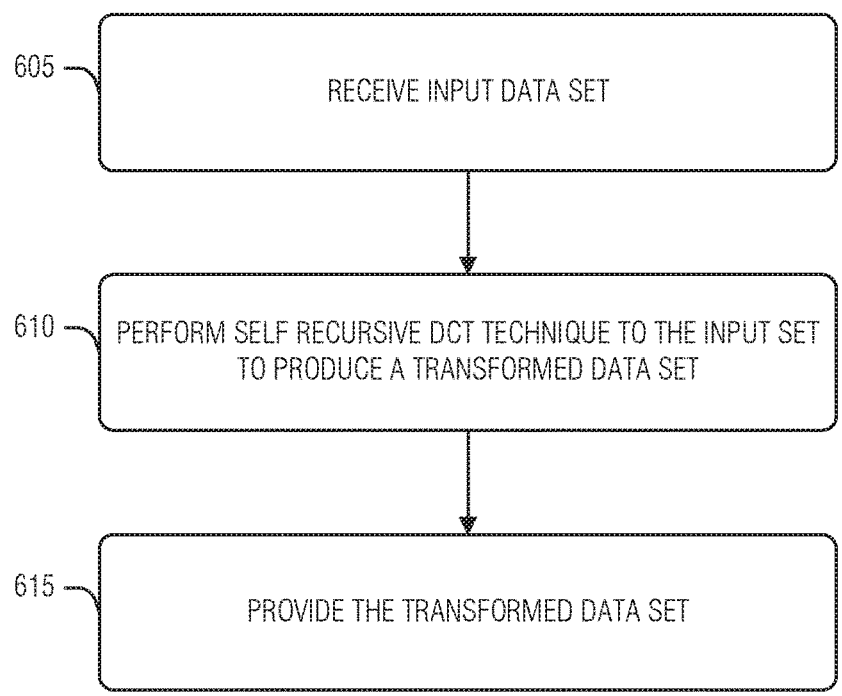
FIG. 6 illustrates a flow diagram of an example of a method for reduced multiplicative complexity DCT circuitry, according to an embodiment.

FIG. 6 illustrates a flow diagram of an example of a method 600 for reduced multiplicative complexity DCT circuitry, according to an embodiment. The operations of the method 600 are implemented in computer hardware, such as that described above (e.g., DSP) or below (e.g., processing circuitry).

At operation 605, an input data set x is received. Here, x has a cardinality of n, where n is two raised to a power greater than or equal to one, and x is in a real coordinate space of n dimensions.

At operation 610, a self-recursive DCT technique is performed on the input data set to produce a transformed data set. Here, the self-recursive DCT technique includes a product of factors of a specified type of DCT technique. Recursive components of the factors include only those that are of the specified type of DCT technique. In an example, the factors do not include a Vandermonde matrix. In an example, performing the self-recursive DCT technique includes configuring a reconfigurable logic device to realize the self-recursive DCT technique including using fewer multiplier cells than a non-self-recursive DCT technique.

In an example, m2. The method of claim m1, wherein the factors comprise an even-odd permutation of x, a bidiagonal matrix, a diagonal matrix, and an orthogonal matrix. In an example, the factors include only the even-odd permutation of x, the bidiagonal matrix, the diagonal matrix, and the orthogonal matrix, and no other components. In an example, the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & 1 \end{bmatrix}.$$

In an example, the diagonal matrix is of the form:

$$[W_c]_{\frac{n}{2}} = diag\left[\frac{\sec\left(\frac{(2k-1)\pi}{2n}\right)}{2}\right]_{k=1}^{\frac{n}{2}}.$$

In an example, the orthogonal matrix is of the form:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n.$$

In these examples, I is an identify matrix and $\tilde{I}$ is an anti-diagonal identity matrix.

In an example, the DCT type is DCT II. In an example, the even-odd permutation of x is of the form $$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}.$$

In an example, the product of factors is of the form $$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n,$$

where, $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ is the orthogonal matrix. In an example, performing the self-recursive DCT technique includes serially processing the factors when n≥4. The serial operations including:

$U = \overline{H}_n x$ then:

$[v_j]_{j=0}^{n-1} = W_n^c u$ then:

$z1 = \cos 2([v_j]_{j=0}^{n_1-1}, n_1)$ and $z2 = \cos 2([v_j]_{j=N_1}^{n-1}, n_1)$ then:

$w = B_n^c (z1^T, z2^T)^T$ and then:

$y = P_n^T w$ where cos 2( ) is the DCT II type self-recursive DCT technique and y is a result of the DCT II type self-recursive DCT technique. In an example, to produce the transformed data set, a result of the product of factors for the DCT II technique $C_n^{II}$ is used in $C_n^{IV} = B_n C_n^{II} [W_c]_n$ to produce a DCT IV type result for the transformed data set.

In an example, the DCT type is DCT III. In an example, the even-odd permutation of x is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}.$$

In an example, the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n,$$

where, $P_n$ is the even-odd permutation, $$B_{\frac{n}{2}}$$

is the bidiagonal matrix, $$[W_c]_{\frac{n}{2}}$$

is the diagonal matrix, and $\overline{H}_n^T$ is the orthogonal matrix. In an example, performing the self-recursive DCT technique includes serially processing the factors when n≥4. The serial operations including:

$u = P_n x$ then:

$[v_j]_{j=0}^{n-1} = [B^c]_n^T u$ then:

$z1 = \cos 3([v_j]_{j=0}^{n_1-1}, n_1)$ then:

$z2 = \cos 2([v_j]_{j=N_1}^{n-1}, n_1)$ then:

$w = [W^c]_n (z1^T, z2^T)^T$ and then:

$y = \overline{H}_n^T w$ where cos 3( ) is the DCT III type self-recursive DCT technique and y is a result of the DCT III type self-recursive DCT technique.

At operation 615, the transformed data set is produced via a hardware output interface to a consumer. In an example, where the input data set comprises discrete values corresponding to samples of a time-varying signal, the transformed data set comprises a frequency-domain representation of the time-varying signal. In an example, where the input data set comprises discrete values corresponding to elements defining an image, the transformed data set comprises a representation of spatial frequencies corresponding to the discrete values. In an example, the discrete values correspond to a specified color channel of the image.

In an example, values obtained from the transformed data set define a compressed representation of the input data set. In an example, a decompressed representation of the input data set is constructed from the compressed representation. In an example, constructing the decompressed representation includes applying weightings corresponding to values from the compressed representation to respective basis functions and summing the basis functions.

Figure 7:
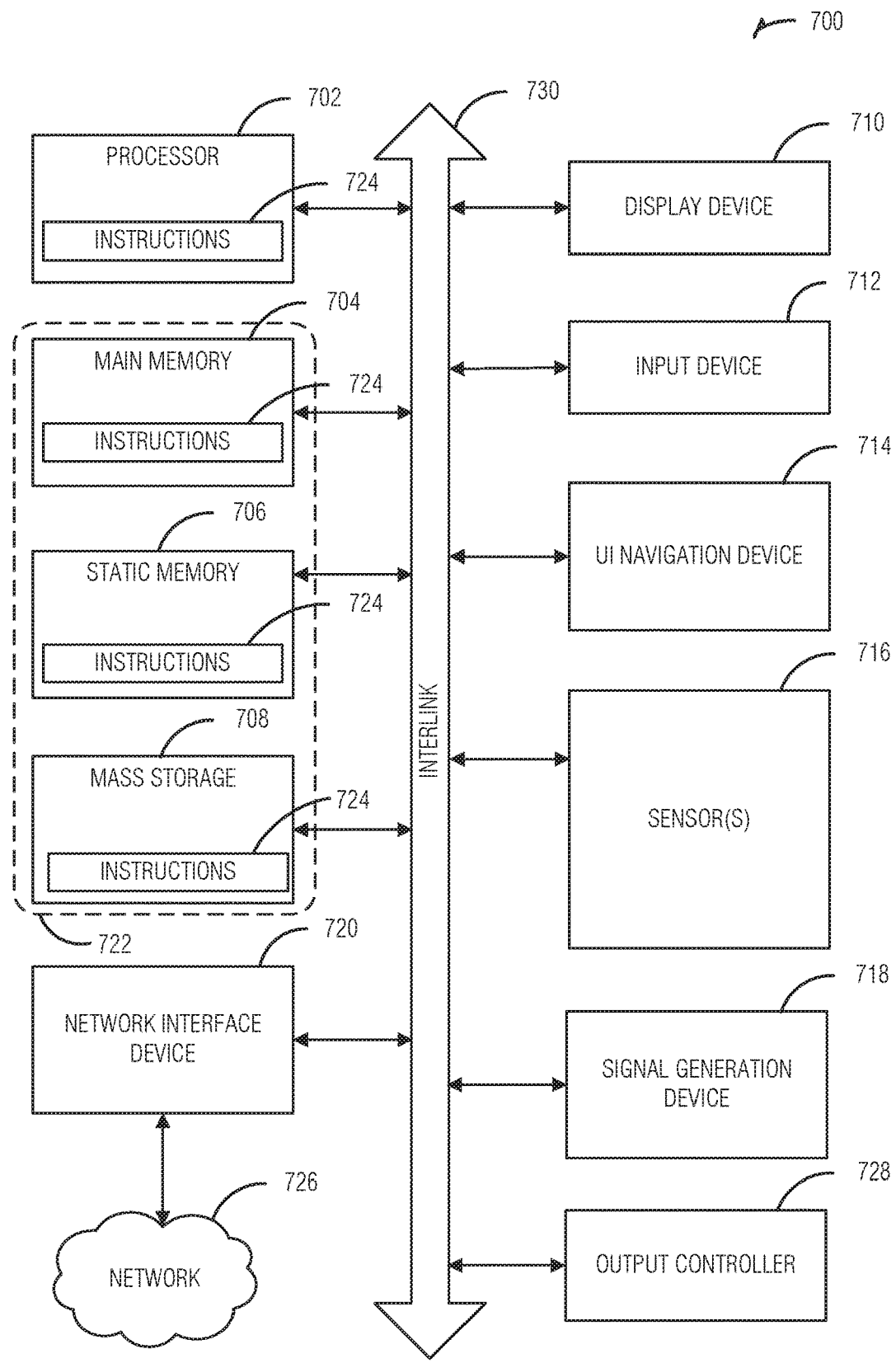
FIG. 7 is a block diagram illustrating an example of a machine upon which one or more embodiments can be implemented.

FIG. 7 illustrates a block diagram of an example machine 700 upon which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can be further transmitted or received over a communications network 726 using a transmission medium via the network interface device 720 utilizing any one of a number of transfer protocols (e.g., frame relay, internet protocol (I P), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional Notes & Examples

Example 1 is a digital signal processor for reduced multiplicative complexity discrete cosine transform (DCT), the digital signal processor comprising: an input hardware interface to receive an input data set x with a cardinality n, where n is two raised to a power greater than or equal to one, and x is in a real coordinate space of n dimensions; processing circuitry to perform a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and an output hardware interface to produce the transformed data set.

In Example 2, the subject matter of Example 1, wherein the factors comprise: an even-odd permutation of x; a bidiagonal matrix; a diagonal matrix; and an orthogonal matrix.

In Example 3, the subject matter of Example 2, wherein the even-odd permutation is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases},$$

wherein the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & 1 \end{bmatrix},$$

wherein the diagonal matrix is of the form:

$$[W_c]_{\frac{n}{2}} = \operatorname{diag}\left[\frac{\sec\left(\frac{(2k-1)\pi}{2n}\right)}{2}\right]_{k=1}^{\frac{n}{2}},$$

and wherein the orthogonal matrix is of the form:

$$\overline{H}_n = \frac{1}{\sqrt{2}} \begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n;$$

where, I is an identify matrix and $\tilde{I}$ is an anti-diagonal identity matrix.

In Example 4, the subject matter of any of Examples 2-3, wherein the DCT type is DCT II.

In Example 5, the subject matter of Example 4, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n,$$

where $P_n^T$ is the even-odd permutation, $$B_{\frac{n}{2}}$$

is bidiagonal matrix, $$[W_c]_{\frac{n}{2}}$$

is the diagonal matrix, and $\overline{H}_n$ is the orthogonal matrix.

In Example 6, the subject matter of Example 5, wherein, to perform the self-recursive DCT technique, the processing circuitry serially processes the factors when n≥4, including: $U = \overline{H}_n x$ then: $[v_j]_{j=0}^{n-1} = W_n^c u$; then: $z1 = \cos 2([v_j]_{j=0}^{n_1-1}, n_1)$ and $z2 = \cos 2([v_j]_{j=n_1}, n_1)$; then: $w = B_n^c (z1^T, z2^T)^T$; and then: $y = P_n^T w$ where cos 2( ) is the DCT II type self-recursive DCT technique and y is a result of the DCT II type self-recursive DCT technique.

In Example 7, the subject matter of any of Examples 5-6, wherein, to produce the transformed data set, a result of the product of factors for the DCT II technique $C_n^{II}$ is used in: $C_n^{IV} = B_n C_n^{II} [W_c]_n$ to produce a DCT IV type result for the transformed data set.

In Example 8, the subject matter of any of Examples 2-7, wherein the DCT type is DCT III.

In Example 9, the subject matter of Example 8, wherein the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n,$$

where $P_n$ is the even-odd permutation, $$B_{\frac{n}{2}}^T$$

is the bidiagonal matrix.

$$[W_c]_{\frac{n}{2}}$$

is the diagonal matrix, and $\overline{H}_n^T$ is the orthogonal matrix.

In Example 10, the subject matter of Example 9, wherein, to perform the self-recursive DCT technique, the processing circuitry serially processes the factors when n≥4, including: $U = P_n^x$ then: $[v_j]_{j=0}^{n-1} = [B^c]_n^T u$; then: $z1 = \cos 3([v_j]_{j=0}^{n_1-1}, n_1)$; and $z2 = \cos 3([v_j]_{j=n_1}, n_1)$; then: $w = [W^c]_n (z1^T, z2^T)^T$; and then: $y = H_n^T w$ where $\cos 3(\ )$ is the DCT III type self-recursive DCT technique and y is a result of the DCT III type self-recursive DCT technique.

In Example 11, the subject matter of any of Examples 1-10, wherein the input data set comprises discrete values corresponding to samples of a time-varying signal, and wherein the transformed data set comprises a frequency-domain representation of the time-varying signal.

In Example 12, the subject matter of any of Examples 1-11, wherein the input data set comprises discrete values corresponding to elements defining an image, and wherein the transformed data set comprises a representation of spatial frequencies corresponding to the discrete values.

In Example 13, the subject matter of Example 12, wherein the discrete values correspond to a specified color channel of the image.

In Example 14, the subject matter of any of Examples 1-13, wherein values obtained from the transformed data set define a compressed representation of the input data set.

In Example 15, the subject matter of Example 14, wherein the processing circuitry is configured to construct a decompressed representation of the input data set from the compressed representation.

In Example 16, the subject matter of Example 15, wherein, to construct the decompressed representation, the processing circuitry applies weightings corresponding to values from the compressed representation to respective basis functions and summing the basis functions.

In Example 17, the subject matter of any of Examples 1-16, wherein, to perform the self-recursive DCT technique, the processing circuitry configures a reconfigurable logic device to realize the self-recursive DCT technique including using fewer multiplier cells than a non-self-recursive DCT technique.

Example 18 is a method for reduced multiplicative complexity discrete cosine transform (DCT) circuitry, the method comprising: receiving, via a hardware input interface, an input data set x with a cardinality n, where n is two raised to a power greater than or equal to one, and x is in a real coordinate space of n dimensions; performing, by processing circuitry, a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and producing the transformed data set via a hardware output interface.

In Example 19, the subject matter of Example 18, wherein the factors comprise: an even-odd permutation of x; a bidiagonal matrix; a diagonal matrix; and an orthogonal matrix.

In Example 20, the subject matter of Example 19, wherein the even-odd permutation is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases},$$

wherein the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & 1 & \\ & & & & 1 \end{bmatrix},$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}},$$

and wherein the orthogonal matrix is of the form:

$$\overline{H}_n = \frac{1}{\sqrt{2}} \begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n,$$

where, I is an identify matrix and $\tilde{I}$ is an anti-diagonal identity matrix.

In Example 21, the subject matter of any of Examples 19-20, wherein the DCT type is DCT II.

In Example 22, the subject matter of Example 21, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n,$$

where $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ is the orthogonal matrix.

In Example 23, the subject matter of Example 22, wherein performing the self-recursive DCT technique includes serially processing the factors in the processing circuitry when $n \geq 4$, the processing circuitry producing: $u = \overline{H}_n x$ then: $[v_j]_{j=0}^{n-1} = W_n^c u$; then: $z1 = \cos 2([v_j]_{j=0}^{n_1-1}, n_1)$ and $z2 = \cos 2([v_j]_{j=n_1}, n_1)$; then: $w = B_n^c (z1^T, z2^T)^T$; and then: $y = P_n^T w$, where $\cos 2(\ )$ is the DCT II type self-recursive DCT technique and y is a result of the DCT II type self-recursive DCT technique.

In Example 24, the subject matter of any of Examples 22-23, wherein, to produce the transformed data set, a result of the product of factors for the DCT II technique $C_n^{II}$ is used by the processing circuitry in: $C_n^{IV} = B_n C_n^{II} [W_c]_n$ to produce a DCT IV type result for the transformed data set.

In Example 25, the subject matter of any of Examples 19-24, wherein the DCT type is DCT III.

In Example 26, the subject matter of Example 25, wherein the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n,$$

where $P_n$ is the even-odd permutation, $$B_{\frac{n}{2}}^T$$

is the bidiagonal matrix $$[W_c]_{\frac{n}{2}}$$

is the diagonal matrix, and $\overline{H}_n^T$ is the orthogonal matrix.

In Example 27, the subject matter of Example 26, wherein performing the self-recursive DCT technique includes serially processing the factors in the processing circuitry when $n \geq 4$, the processing circuitry producing: $U = P_n x$ then: $[v_j]_{j=0}^{n-1} = [B^c]_n^T u$; then: $z1 = \cos 3([v_j]_{j=0}^{n_1-1}, n_1)$ and $z2 = \cos 3([v_j]_{j=n_1}, n_1)$; then: $w = [W^c]_n (z1^T, z2^T)^T$ and then: $y = H_n^T w$, where $\cos 3(\ )$ is the DCT III type self-recursive DCT technique and y is a result of the DCT III type self-recursive DCT technique.

In Example 28, the subject matter of any of Examples 18-27, wherein the input data set comprises discrete values corresponding to samples of a time-varying signal, and wherein the transformed data set comprises a frequency-domain representation of the time-varying signal.

In Example 29, the subject matter of any of Examples 18-28, wherein the input data set comprises discrete values corresponding to elements defining an image, and wherein the transformed data set comprises a representation of spatial frequencies corresponding to the discrete values.

In Example 30, the subject matter of Example 29, wherein the discrete values correspond to a specified color channel of the image.

In Example 31, the subject matter of any of Examples 18-30, wherein values obtained from the transformed data set define a compressed representation of the input data set.

In Example 32, the subject matter of Example 31, comprising constructing a decompressed representation of the input data set from the compressed representation.

In Example 33, the subject matter of Example 32, wherein constructing the decompressed representation includes applying weightings corresponding to values from the compressed representation to respective basis functions and summing the basis functions.

In Example 34, the subject matter of any of Examples 18-33, wherein performing the self-recursive DCT technique includes configuring a reconfigurable logic device to realize the self-recursive DCT technique including using fewer multiplier cells than a non-self-recursive DCT technique.

Example 35 is a machine readable medium including instructions for reduced multiplicative complexity discrete cosine transform (DCT), the instructions, when processed by computer hardware, cause processing circuitry to perform operations comprising: receiving an input data set x with a cardinality n, where n is two raised to a power greater than or equal to one, and x is in a real coordinate space of n dimensions; performing a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and producing the transformed data set.

In Example 36, the subject matter of Example 35, wherein the factors comprise: an even-odd permutation of x; a bidiagonal matrix; a diagonal matrix; and an orthogonal matrix.

In Example 37, the subject matter of Example 36, wherein the even-odd permutation is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}.$$

wherein the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & 1 \end{bmatrix},$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}},$$

and wherein the orthogonal matrix is of the form:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n,$$

where I is an identify matrix and $\tilde{I}$ is an anti-diagonal identity matrix.

In Example 38, the subject matter of any of Examples 36-37, wherein the DCT type is DCT II.

In Example 39, the subject matter of Example 38, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n,$$

where $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ is the orthogonal matrix.

In Example 40, the subject matter of Example 39, wherein performing the self-recursive DCT technique includes serially processing the factors when n≥4, the serial processing including: $U=\overline{H}_n x$ then: $[v_j]_{j=0}^{n-1}=W_n^c u$; then: $z1=\cos 2([v_j]_{j=0}^{n_1-1}, n_1)$ and $$z2 = \cos2([v_j]_{j=n_1}^{n-1}, n_1);$$

then: $w=B_n^c(z1^T, z2^T)^T$; and then: $y=P_n^T w$, where cos 2( ) is the DCT II type self-recursive DCT technique and y is a result of the DCT II type self-recursive DCT technique.

In Example 41, the subject matter of any of Examples 39-40, wherein, to produce the transformed data set, a result of the product of factors for the DCT II technique $C_n^{II}$ is used in: $C_n^{IV}=B_n C_n^{II}[W_c]_n$ to produce a DCT IV type result for the transformed data set.

In Example 42, the subject matter of any of Examples 36-41, wherein the DCT type is DCT III.

In Example 43, the subject matter of Example 42, wherein the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}} \end{bmatrix}$$

where $P_n$ is the even-odd permutation, $$B_{\frac{n}{2}}^T$$

is the bidiagonal matrix, $$[W_c]_{\frac{n}{2}}$$

is the diagonal matrix, and $\overline{H}_n^T$ is the orthogonal matrix.

In Example 44, the subject matter of Example 43, wherein performing the self-recursive DCT technique includes serially processing the factors when n≥4, the serial processing including: $u=P_n x$ then: $[v_j]_{j=0}^{n-1}=[B^c]_n^T u$; then: $z1=\cos 3([v_j]_{j=0}^{n_1-1}, n_1)$ and $z2=\cos 3([v_j]_{j=n_1}^{n_1}, n_1)$; then: $w=[W^c]_n (z1^T, z2^T)^T$; and then: $y=H_n^T w$, where cos 3( ) is the DCT III type self-recursive DCT technique and y is a result of the DCT III type self-recursive DCT technique.

In Example 45, the subject matter of any of Examples 35-44, wherein the input data set comprises discrete values corresponding to samples of a time-varying signal, and wherein the transformed data set comprises a frequency-domain representation of the time-varying signal.

In Example 46, the subject matter of any of Examples 35-45, wherein the input data set comprises discrete values corresponding to elements defining an image, and wherein the transformed data set comprises a representation of spatial frequencies corresponding to the discrete values.

In Example 47, the subject matter of Example 46, wherein the discrete values correspond to a specified color channel of the image.

In Example 48, the subject matter of any of Examples 35-47, wherein values obtained from the transformed data set define a compressed representation of the input data set.

In Example 49, the subject matter of Example 48, wherein the operations comprise constructing a decompressed representation of the input data set from the compressed representation.

In Example 50, the subject matter of Example 49, wherein constructing the decompressed representation includes applying weightings corresponding to values from the compressed representation to respective basis functions and summing the basis functions.

In Example 51, the subject matter of any of Examples 35-50, wherein performing the self-recursive DCT technique includes configuring a reconfigurable logic device to realize the self-recursive DCT technique including using fewer multiplier cells than a non-self-recursive DCT technique.

Example 52 is a system for reduced multiplicative complexity discrete cosine transform (DCT), the system comprising: means for receiving an input data set x with a cardinality n, where n is two raised to a power greater than or equal to one, and x is in a real coordinate space of n dimensions: means for performing a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and means for producing the transformed data set.

In Example 53, the subject matter of Example 52, wherein the factors comprise: an even-odd permutation of x; a bidiagonal matrix; a diagonal matrix; and an orthogonal matrix.

In Example 54, the subject matter of Example 53, wherein the even-odd permutation is of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases},$$

wherein the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & & 1 \end{bmatrix},$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}},$$

and wherein the orthogonal matrix is of the form:

$$\overline{H}_n = \frac{1}{\sqrt{2}} \begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n,$$

where I is an identify matrix and Ĩ is an anti-diagonal identity matrix.

In Example 55, the subject matter of any of Examples 53-54, wherein the DCT type is DCT II.

In Example 56, the subject matter of Example 55, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n.$$

where $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ is the orthogonal matrix.

In Example 57, the subject matter of Example 56, wherein the means for performing the self-recursive DCT technique include means for serially processing the factors when $n \geq 4$, the serial processing including: $U = \overline{H}_n x$; then: $[v_j]_{j=0}^{n-1} = W_n^c u$; then: $z1 = \cos 2([v_j]_{j=0}^{n_1-1}, n_1)$ and $z2 = \cos 2([v_j]_{j=n_1}, n_1)$; then: $w = B_n^c(z1^T, z2^T)^T$; and then: $y = P_n^T w$, where $\cos 2( )$ is the DCT II type self-recursive DCT technique and y is a result of the DCT II type self-recursive DCT technique.

In Example 58, the subject matter of any of Examples 56-57, wherein, to produce the transformed data set, a result of the product of factors for the DCT II technique $C_n^{II}$ is used in: $C_n^{IV} = B_n C_n^{II}[W_c]_n$ to produce a DCT IV type result for the transformed data set.

In Example 59, the subject matter of any of Examples 53-58, wherein the DCT type is DCT III.

In Example 60, the subject matter of Example 59, wherein the product of factors is of the form:

$$C_n^{III} = \overline{H}_n^T \begin{bmatrix} I_{\frac{n}{2}} & 0 \\ 0 & [W_c]_{\frac{n}{2}} \end{bmatrix} \begin{bmatrix} C_{\frac{n}{2}}^{III} & 0 \\ 0 & C_{\frac{n}{2}}^{III} \end{bmatrix} \begin{bmatrix} I_{\frac{n}{2}} & 0 \\ 0 & B_{\frac{n}{2}}^T \end{bmatrix} P_n,$$

where $P_n$ is the even-odd permutation, $$B_{\frac{n}{2}}^T$$

is the bidiagonal matrix, $$[W_c]_{\frac{n}{2}}$$

is diagonal matrix, and $\overline{H}_n^T$ is the orthogonal matrix.

In Example 61, the subject matter of Example 60, wherein the means for performing the self-recursive DCT technique include means for serially processing the factors when $n \geq 4$, the serial processing including: $U = P_n x$; then: $[v_j]_{j=0}^{n-1} = [B^c]_n^T u$; then: $z1 = \cos 3([v_j]_{j=0}^{n_1-1}, n_1)$ and $z2 = \cos 3([v_j]_{j=n_1}, n_1)$; then: $w = [W^c]_n(z1^T, z2^T)^T$; and then: $y = H_n^T w$, where $\cos 3( )$ is the DCT III type self-recursive DCT technique and y is a result of the DCT III type self-recursive DCT technique.

In Example 62, the subject matter of any of Examples 52-61, wherein the input data set comprises discrete values corresponding to samples of a time-varying signal, and wherein the transformed data set comprises a frequency-domain representation of the time-varying signal.

In Example 63, the subject matter of any of Examples 52-62, wherein the input data set comprises discrete values corresponding to elements defining an image, and wherein the transformed data set comprises a representation of spatial frequencies corresponding to the discrete values.

In Example 64, the subject matter of Example 63, wherein the discrete values correspond to a specified color channel of the image.

In Example 65, the subject matter of any of Examples 52-64, wherein values obtained from the transformed data set define a compressed representation of the input data set.

In Example 66, the subject matter of Example 65, comprising means for constructing a decompressed representation of the input data set from the compressed representation.

In Example 67, the subject matter of Example 66, wherein the means for constructing the decompressed representation include means for applying weightings corresponding to values from the compressed representation to respective basis functions and summing the basis functions.

In Example 68, the subject matter of any of Examples 52-67, wherein the means for performing the self-recursive DCT technique include means for configuring a reconfigurable logic device to realize the self-recursive DCT technique including using fewer multiplier cells than a non-self-recursive DCT technique.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A digital signal processor for reduced multiplicative complexity discrete cosine transform (DCT), the digital signal processor comprising:
    an input hardware interface to receive an input data set x with a cardinality n, where n is two raised to a power greater than or equal to one, and x is in a real coordinate space of n dimensions;
    processing circuitry to perform a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and
    an output hardware interface to produce the transformed data set.

2. The digital signal processor of claim 1, wherein the factors comprise:
    an even-odd permutation of x;
    a bidiagonal matrix;
    a diagonal matrix; and
    an orthogonal matrix.

3. The digital signal processor of claim 1, wherein the input data set comprises discrete values corresponding to samples of a time-varying signal, and wherein the transformed data set comprises a frequency-domain representation of the time-varying signal.

4. The digital signal processor of claim 1, wherein the input data set comprises discrete values corresponding to elements defining an image, and wherein the transformed data set comprises a representation of spatial frequencies corresponding to the discrete values.

5. The digital signal processor of claim 2, wherein the even-odd permutation is of the form:

$$P_n x = \begin{cases} [x_0, x_2, ..., x_{n-2}, x_1, x_3, ..., x_{n-1}]^T \text{ even } n \\ [x_0, x_2, ..., x_{n-1}, x_1, x_3, ..., x_{n-2}]^T \text{ odd } n \end{cases}$$

wherein the bidiagonal matrix is of the form:

$$B_{\frac{n}{2}} = \begin{bmatrix} \sqrt{2} & 1 & & & \\ & 1 & 1 & & \\ & & \ddots & & \\ & & & 1 & \\ & & & & 1 \end{bmatrix}$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}}$$

and wherein the orthogonal matrix is of the form:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n$$

where I is an identify matrix and Ĩ is an anti-diagonal identity matrix.

6. The digital signal processor of claim 2, wherein the DCT type is DCT II.

7. The digital signal processor of claim 6, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n$$

where, $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ the orthogonal matrix.

8. The digital signal processor of claim 7, wherein, to perform the self-recursive DCT technique, the processing circuitry serially processes the factors when n≥4, including:

$u = \overline{H}_n x$ then:

$[v_j]_{j=0}^{n-1} = W_n^c u$ then:

$z1 = \cos 2([v_j]_{j=0}^{n1-1}, n_1)$ and $z2 = \cos 2([v_j]_{j=n_1}^{-1}, n_1)$ then:

$w = B_n^c (z1^T, z2^T)^T$ and then:

$y = P_n^T w$ where cos 2( ) is the DCT II type self-recursive DCT technique and y is a result of the DCT II type self-recursive DCT technique.

9. A method for reduced multiplicative complexity discrete cosine transform (DCT) circuitry, the method comprising:

receiving, via a hardware input interface, an input data set x with a cardinality n, where n is two raised to a power greater than or equal to one, and x is in a real coordinate space of n dimensions;

performing, by processing circuitry, a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and producing the transformed data set via a hardware output interface.

10. The method of claim 9, wherein the factors comprise:
an even-odd permutation of x;
a bidiagonal matrix;
a diagonal matrix; and
an orthogonal matrix.

11. The method of claim 9, wherein the input data set comprises discrete values corresponding to samples of a time-varying signal, and wherein the transformed data set comprises a frequency-domain representation of the time-varying signal.

12. The method of claim 9, wherein the input data set comprises discrete values corresponding to elements defining an image, and wherein the transformed data set comprises a representation of spatial frequencies corresponding to the discrete values.

13. The method of claim 10, wherein the even-odd permutation of the form:

$$P_n x = \begin{cases} [x_0, x_2, \ldots, x_{n-2}, x_1, x_3, \ldots, x_{n-1}]^T & \text{even } n \\ [x_0, x_2, \ldots, x_{n-1}, x_1, x_3, \ldots, x_{n-2}]^T & \text{odd } n \end{cases}$$

wherein the bidiagonal matrix is of the form:

$$B_{\frac{n}{2}} = \begin{bmatrix} \sqrt{2} & 1 & & & \\ & 1 & 1 & & \\ & & \ddots & & \\ & & & 1 & \\ & & & & 1 \end{bmatrix}$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}}$$

and wherein the orthogonal matrix is of the form:

$$\overline{H}_n = \frac{1}{\sqrt{2}}\begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n$$

where I is an identify matrix and Ĩ is an anti-diagonal identity matrix.

14. The method of claim 10, wherein the DCT type is DCT II.

15. The method of claim 14, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & B_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n$$

where, $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ the orthogonal matrix.

16. The method of claim 15, wherein performing the self-recursive DCT technique includes serially processing the factors in the processing circuitry when n≥4, the processing circuitry producing:

$$u = \overline{H}_n x$$

then:

$$[v_j]_{j=0}^{n-1} = W_n^c u$$

then:

$$z1 = \cos 2([v_j]_{j=0}^{n1-1}, n_1)$$

and $$z2 = \cos 2([v_j]_{j=n_1}^{-1}, n_1)$$

then:

$$w = B_n^c (z1^T, z2^T)^T$$

and then:

$$y = P_n^T w$$

where cos 2( ) is the DCT II type self-recursive DCT technique and y is a result of the DCT II type self-recursive DCT technique.

17. A non-transitory machine readable medium including instructions for reduced multiplicative complexity discrete cosine transform (DCT), the instructions, when processed by computer hardware, cause processing circuitry to perform operations comprising:
receiving an input data set x with a cardinality n, where n is two raised to a power greater than or equal to one, and x is in a real coordinate space of n dimensions;
performing a self-recursive DCT technique to the input data set to produce a transformed data set, the self-recursive DCT technique comprising a product of factors of a specified type of DCT technique, the factors including only recursive components that are of the specified type of DCT technique, wherein the factors do not include a Vandermonde matrix; and
producing the transformed data set.

18. The non-transitory machine readable medium of claim 17, wherein the factors comprise:
an even-odd permutation of x;
a bidiagonal matrix;
a diagonal matrix; and
an orthogonal matrix.

19. The non-transitory machine readable medium of claim 17, wherein the input data set comprises discrete values corresponding to samples of a time-varying signal, and wherein the transformed data set comprises a frequency-domain representation of the time-varying signal.

20. The non-transitory machine readable medium of claim 17, wherein the input data set comprises discrete values corresponding to elements defining an image, and wherein the transformed data set comprises a representation of spatial frequencies corresponding to the discrete values.

21. The non-transitory machine readable medium of claim 18, wherein the even-odd permutation is of the form:

$$P_n x \begin{cases} [x_0, x_2, \dots, x_{n-2}, x_1, x_3, \dots, x_{n-1}]^T & \text{even } n \\ [x_0, x_2, \dots, x_{n-1}, x_1, x_3, \dots, x_{n-2}]^T & \text{odd } n \end{cases}$$

wherein the bidiagonal matrix is of the form:

$$B_{\frac{n}{2}} = \begin{bmatrix} \sqrt{2} & 1 & & & \\ & 1 & 1 & & \\ & & \ddots & \ddots & \\ & & & & 1 \\ & & & & 1 \end{bmatrix}$$

wherein the diagonal matrix is of the form:

$$[W_c]_{\frac{n}{2}} = \text{diag}\left[\frac{\sec\left(\frac{(2k-1)\pi}{2n}\right)}{2}\right]_{k=1}^{\frac{n}{2}}$$

and wherein the orthogonal matrix is of the form:

$$\overline{H}_n = \frac{1}{\sqrt{2}} \begin{bmatrix} I_{\frac{n}{2}} & \tilde{I}_{\frac{n}{2}} \\ I_{\frac{n}{2}} & -I_{\frac{n}{2}} \end{bmatrix} = \frac{1}{\sqrt{2}} H_n$$

where I is an identify matrix and $\tilde{I}$ is an anti-diagonal identity matrix.

22. The non-transitory machine readable medium of claim 18, wherein the DCT type is DCT II.

23. The non-transitory machine readable medium of claim 22, wherein the product of factors is of the form:

$$C_n^{II} = P_n^T \begin{bmatrix} I_{\frac{n}{2}} & 0 \\ 0 & B_{\frac{n}{2}} \end{bmatrix} \begin{bmatrix} C_{\frac{n}{2}}^{II} & 0 \\ 0 & C_{\frac{n}{2}}^{II} \end{bmatrix} \begin{bmatrix} I_{\frac{n}{2}} & 0 \\ 0 & [W_c]_{\frac{n}{2}} \end{bmatrix} \overline{H}_n$$

where, $P_n^T$ is the even-odd permutation, $$B_{\frac{n}{2}}$$

is the bidiagonal matrix, $$[W_c]_{\frac{n}{2}}$$

is the diagonal matrix, and $\overline{H}_n$ is the orthogonal matrix.

24. The non-transitory machine readable medium of claim 23, wherein performing the self-recursive DCT technique includes serially processing the factors when n≥4, the serial processing including:

$$u = \overline{H}_n x$$

then:

$$[v_j]_{j=0}^{n-1} = W_n^c u$$

then:

$$z1 = \cos 2([v_j]_{j=0}^{n1-1}, n_1)$$

and $$z2 = \cos 2([v_j]_{j=n_1}^{-1}, n_1)$$

then:

$$w = B_n^c (z1^T, z2^T)^T$$

and then:

$$y = P_n^T w$$

where cos 2( ) is the DCT II type self-recursive DCT technique and y is a result of the DCT II type self-recursive DCT technique.

* * * * *